US006210515B1

(12) United States Patent
Boreali et al.

(10) Patent No.: US 6,210,515 B1
(45) Date of Patent: Apr. 3, 2001

(54) LINERLESS LABEL PRINTER CONTROL

(75) Inventors: Jeffrey J. Boreali, N. Tonawanda; Jimme A. Harrod, Grand Island, both of NY (US)

(73) Assignee: Moore Business Forms, Inc., Grand Island, NY (US)

(*) Notice: Subject to any disclaimer, the term of this patent is extended or adjusted under 35 U.S.C. 154(b) by 0 days.

(21) Appl. No.: 08/394,953

(22) Filed: Feb. 27, 1995

(51) Int. Cl.[7] ..................................................... B32B 31/00
(52) U.S. Cl. .......................... 156/250; 156/277; 156/387
(58) Field of Search .................................... 156/277, 384, 156/497, 387, 250, 539, 556, 566; 271/33, 309

(56) References Cited

U.S. PATENT DOCUMENTS

| | | | |
|---|---|---|---|
| 614,772 * | 11/1898 | Siegel | 271/33 |
| 2,764,408 * | 9/1956 | Weiler | 271/33 |
| 2,972,428 | 2/1961 | Dubbs . | |
| 3,674,606 * | 7/1972 | Kinslow | 156/497 |
| 3,728,987 * | 4/1973 | Kronseder | 118/62 |
| 3,907,280 * | 9/1975 | Bendall et al. | 217/309 |
| 4,082,439 * | 4/1978 | Seitz . | |
| 4,108,711 | 8/1978 | Hoffmann . | |
| 4,124,429 * | 11/1978 | Crankshaw | 156/449 X |
| 4,181,555 | 1/1980 | Hoffmann . | |
| 4,321,103 * | 3/1982 | Lindstrom et al. | 156/351 |
| 4,680,078 | 7/1987 | Vanderpool et al. . | |

(List continued on next page.)

FOREIGN PATENT DOCUMENTS

| | | | |
|---|---|---|---|
| 1187051 * | 5/1985 | (CA) | 156/387 |
| 2116960 | 4/1993 | (CA) . | |
| 41 32 369 A1 | 4/1993 | (DE) . | |
| 0 361 693 | 4/1990 | (EP) . | |
| 0361 693A2 | 4/1990 | (EP) . | |
| 0361 693A3 | 4/1990 | (EP) . | |
| 0 637 547 A1 | 2/1995 | (EP) . | |
| 0637 547 | 2/1995 | (EP) . | |
| 1402157 * | 8/1975 | (GB) | 271/309 |
| 2233965 * | 1/1991 | (GB) | 271/309 |
| 0074871 * | 4/1988 | (JP) | 156/497 |

OTHER PUBLICATIONS

Specification sheet and description of Datamax "Prodigy Plus" Label Printer, 1992.

Beaudrot, "Backup Pickoff Control", IBM Technical Disclosure Bulletin, Dec. 1972.*

*Primary Examiner*—Richard Crispino
(74) *Attorney, Agent, or Firm*—Nixon & Vanderhye PC

(57) ABSTRACT

A thermal printer for printing linerless labels is operated so that the pressure sensitive adhesive of the second face of the labels does not stick to a drive roller which advances and reverses the labels, and cooperates with the thermal print head to effect printing. A cutter is disposed downstream of the print head and drive roll from a linerless label roll takeoff. Between the cutter and the drive roller is an air knife which directs a substantially uniform flow of gas to the peripheral surface of the drive roller to prevent the adhesive of the labels from sticking to the drive roller peripheral surface. Air flow through the air knife is at a pressure of about 20–50 psi (preferably about 30 psi) and the air flow may be provided continuously or only during initiation and continuation of printing and advancing the printer. Operation of the drive roller is also controlled to prevent sticking by advancing the roll of linerless labels so that the leading edge is aligned with the cutter, completely formatting the printer while the leading edge is aligned with the cutter, reversing the label leading edge by operating the drive roll so that the leading edge moves to an initial position for printing of the leading label of the roll, and with a delay of less than 0.5 seconds (i.e. substantially immediately) initiating printing and advancing so that the adhesive does not have any opportunity to stick to the drive roller.

12 Claims, 3 Drawing Sheets

U.S. PATENT DOCUMENTS

| | | | | |
|---|---|---|---|---|
| 4,707,211 | | 11/1987 | Shibata . | |
| 4,769,103 | | 9/1988 | Koike . | |
| 4,784,714 | | 11/1988 | Shibata . | |
| 4,807,177 | * | 2/1989 | Ward . | |
| 4,834,826 | * | 5/1989 | Abe et al. | 156/344 |
| 4,996,539 | * | 2/1991 | Haraga et al. . | |
| 5,155,639 | * | 10/1992 | Platter et al. . | |
| 5,286,317 | | 2/1994 | Treat . | |
| 5,431,763 | | 7/1995 | Bradshaw | 156/256 |
| 5,437,228 | | 8/1995 | Uland | 101/288 |
| 5,524,996 | | 6/1996 | Carpenter et al. . | |

* cited by examiner

Fig. 1A (PRIOR ART)
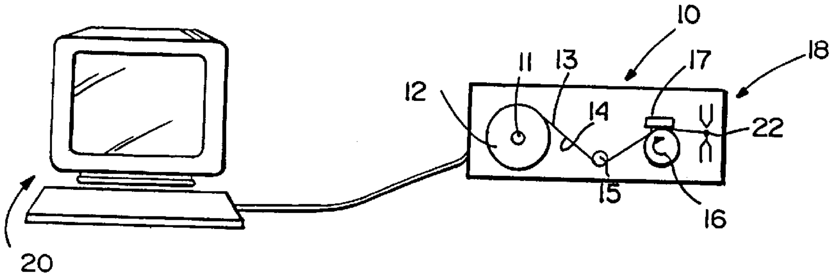
Fig. 1B
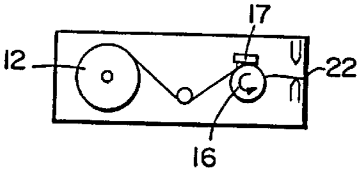
Fig. 1C
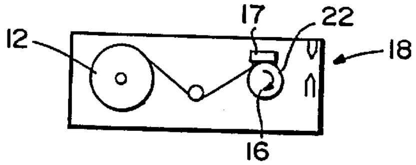
Fig. 2A
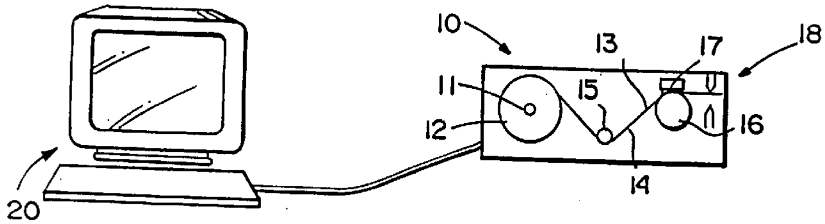
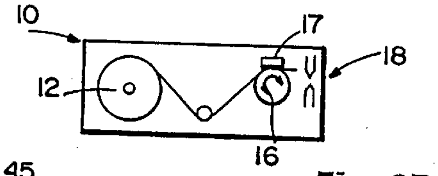
Fig. 2B
Fig. 4
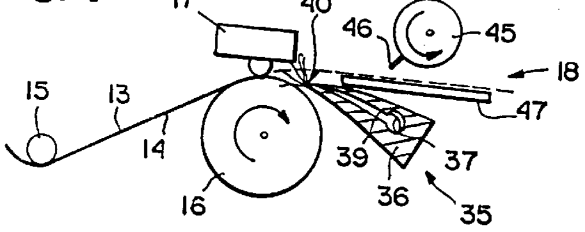

LINERLESS LABEL PRINTER CONTROL

BACKGROUND AND SUMMARY OF THE INVENTION

Linerless labels are becoming increasingly popular because of the environmental and other advantages associated with them. Oftentimes the linerless labels are printed, particularly with thermal printers, such as a Moore Millennium Linerless Label Printer available from Moore Business Forms of Lake Forest, Ill. and the Datamax Prodigy Plus™ linerless label printer available from Datamax of Eden Prairie, Minn. Such printers, and most other thermal printers, have a thermal print head which squeezes the label between itself and a drive roller which has a non-stick coating (such as a plasma coating or silicone coating). For example, in the Datamax Prodigy Plus™ Printer the print head exerts approximately a 9.5 pound compressive force, which is necessary to insure good print quality and a positive driving force to feed the label through the printer. While this compressive force is necessary for proper operation, even though the drive roller peripheral surface has a non-stick configuration, it is still possible for the adhesive of a label to stick to the drive roller peripheral surface. According to the present invention it has been found that this occurs primarily during a particular sequence of operation of the printer, and when the adhesive is a particularly aggressive adhesive, such as a permanent pressure sensitive adhesive (as opposed to removable or repositional pressure sensitive adhesives).

In typical operation of a Datamax Prodigy Plusυ printer to print linerless labels, the operator selects and inputs a quantity of labels to run in a batch. The printer recognizes a signal from the software of the computer and receives a first format for setting up the printer, e.g. which is data about the particular labels to be printed including perhaps graphics, text, bar codes, relative positioning, desired label length, etc. The printer then backfeeds the label and parks the leading edge under the print head until a second format is loaded. Once a second format is loaded, the printer advances the leading label of the roll and prints the first label. Depending upon the complexity of the formats the label may be parked under the print head for as long as two to three seconds while formatting. It has been recognized that when a label is parked under the print head without immediately being advanced the label's adhesive starts to attract or grab the non-stick peripheral surface of the drive roller. When the label is finally advanced, the drive roller does not have enough time to release the label and, therefore, the label wraps around the roller or jams the printer. There can be sticking at other times, too, where particularly aggressive pressure sensitive adhesives are provided on the labels.

According to the present invention various methods and apparatus are utilized for solving the problem described above. According to the present invention by modifying the operation of the thermal printer, and/or by directing a substantially uniform stream of gas under pressure to the interface area between the label and the drive roller peripheral surface it is possible, to prevent the labels from wrapping around the roller when it is rotated. A change in printer operation is effected merely by changing the sequence of operation in the firmware of the printer (that is, in the printer computer control chip).

According to one aspect of the present invention a method of operating a printer having a non-stick peripheral surface drive roller, cutter, and print head to print linerless labels in a roll having a printable first face and a second face with pressure sensitive adhesive without the pressure sensitive adhesive sticking to the drive roller, is provided. While the invention is particularly applicable to thermal printers it is not limited to them, but may be used with other linerless label printers. The method comprises the steps of substantially sequentially: (a) Operating the drive roller to advance the roll of linerless labels so that the second face is in contact with the drive roller and so that the leading edge of the linerless labels in the roll is aligned with the cutter, in a first position. (b) Completely formatting the printer while the leading edge is in the first position, so that the printer has all necessary print commands to print a leading label in the roll, or series of labels in the roll. (c) Reversing the label leading edge by operating the drive roller so that the leading edge moves to an initial position for printing of the leading label in the roll by the print head. And (d) substantially immediately after step (c) initiating printing and advancing of the leading label, and cutting of the leading label from the roll, and continuing printing and advancing and cutting until the leading label or series of labels is or are printed and cut.

There is also preferably the further step of (e) at least during the practice of step (d) supplying a substantially uniform flow of pressurized gas between the second face of the label at the drive roller and the drive roller to prevent the pressure sensitive adhesive of the second face from sticking to the drive roller. Step (e) is typically practiced by supplying a substantially uniform flow of gas at a pressure of about 20–50 psi, preferably about 30 psi. Step (e) may be practiced substantially continuously through all of steps (a) through (d), or only when step (d) is being practiced. Step (d) is typically practiced with a delay of less than 0.5 seconds (typically less than 0.1 second) once reversing action pursuant to step (c) has been stopped.

As indicated above, the roll of linerless labels preferably comprises a thermal printable first face, and the print head comprises a thermal print head. In that case step (d) is practiced by applying heat to the first face of each label to effect printing while applying a compressive force by the print head to the first face of each label, e.g. a compressive force of about 9–10 pounds.

According to another aspect of the present invention a method of operating a printer to print linerless labels without the adhesive sticking to the drive roller is provided which comprises the following steps: (a) Operating the drive roller to advance the roll of linerless labels so that the second face is in contact with the drive roller and so that the leading edge of the linerless labels in the roll is aligned with the cutter, in a first position. (b) Formatting the printer. (c) Reversing the label leading edge by operating the drive roller so that the leading edge moves to an initial position for printing of the leading label in the roll by the print head. (d) Initiating and continuing printing and advancing of the leading label, and cutting of the leading label from the roll, until the leading label or series of labels is or are printed and cut. And (e) at least during the practice of step (d) supplying a substantially uniform flow of pressurized gas between the second face of the label at the drive roller and the drive roller to prevent the pressure sensitive adhesive of the second face from sticking to the drive roller. The details of steps (d) and (e) are as set forth above with respect to the first method described.

The invention also comprises a thermal printer for printing linerless labels in a roll. The thermal printer comprises the following elements: A support for take-off of linerless labels from a roll of linerless labels, the labels having a thermally printable first face, and a second face with pressure sensitive adhesive. A drive roller having a non-stick peripheral surface for engaging the second face to advance or reverse the labels. A thermal print head for engaging the first face of the labels and applying a compressive force on the labels biasing them into contact with the drive roller peripheral surface. A cutter for cutting labels from the roll after printing, the cutter on the opposite side of the thermal print head from the support. And an air knife disposed between the drive roller and the cutter for directing a substantially uniform flow of gas to the interface area between a label and the peripheral surface of the drive roller to prevent the adhesive of the second face of the labels of the roll from wrapping around the drive roller peripheral surface when the driver roller is rotated. The air knife typically comprises a gas-directing end having an end surface with at least three substantially evenly spaced gas-emanating openings formed therein. Each opening typically has a maximum dimension of about 0.01 to about 0.05 inches, preferably a diameter of about 0.03 inches.

It is a primary object of the present invention to effectively print linerless labels without the labels sticking to the printer drive roll, and particularly suited for thermal printers. This and other objects of the invention will become clear from an inspection of the detailed description of the invention and from the appended claims.

BRIEF DESCRIPTION OF THE DRAWINGS

FIGS. 1A through 1C show, schematically, a conventional prior art thermal printer and the sequence of operational steps thereof which can cause the linerless labels being printed to undesirably wrap around the drive roller (FIG. 1C);

FIGS. 2A and 2B are schematic representations of the operation of the printer of FIGS. 1A–1C according to the method of the present invention;

FIG. 4 is a side schematic view of components of an exemplary thermal printer according to the present invention which utilizes an air knife to further facilitate non-stick of the linerless labels being printed to the drive roller.

DETAILED DESCRIPTION OF THE DRAWINGS

Figure 3:
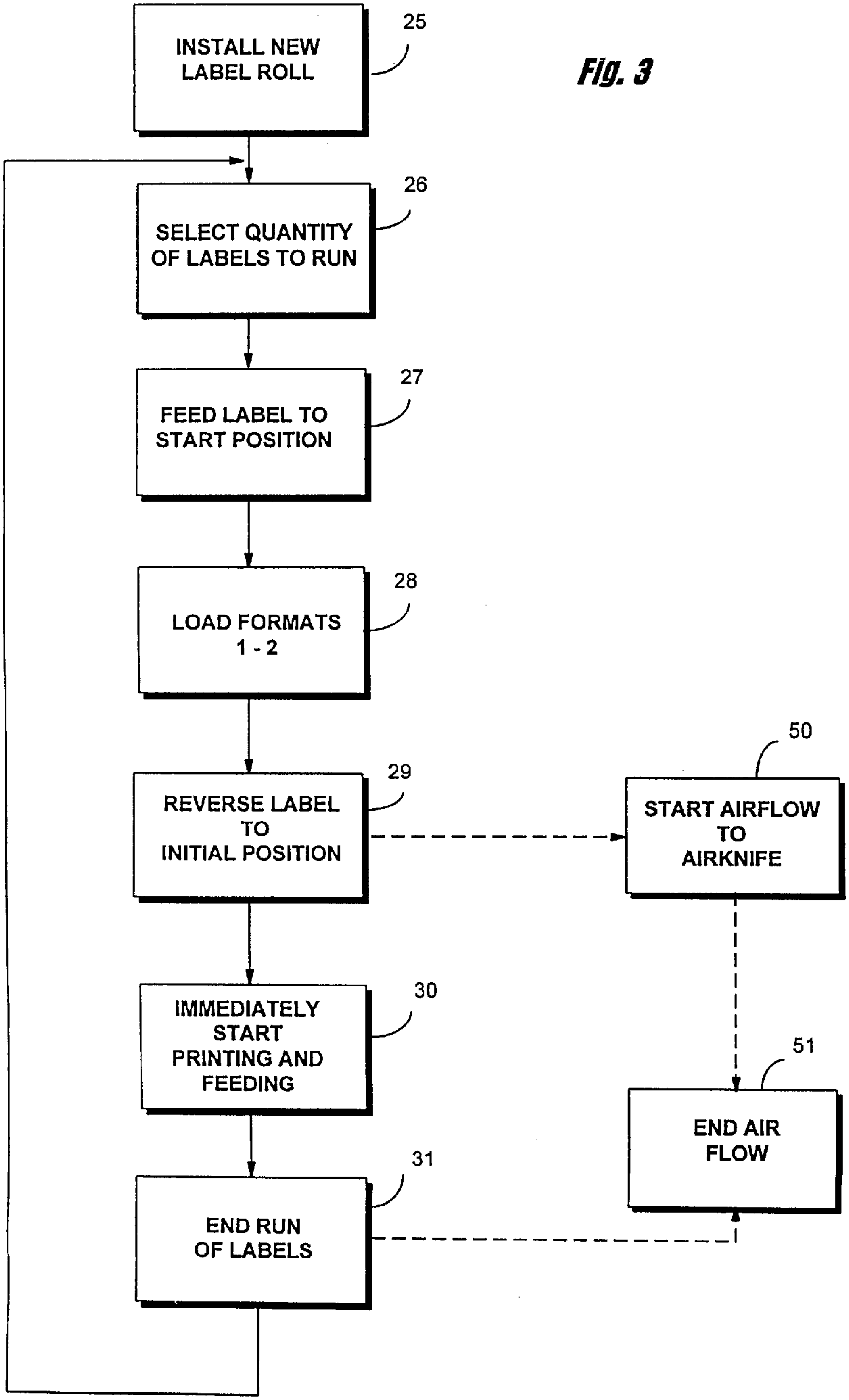
FIG. 3 is a schematic flow sheet illustrating exemplary steps in the operation of the thermal printer according to FIGS. 2A and 2B.

FIGS. 1A–1C show the conventional operation of a Datamax "Prodigy Plus" linerless label thermal printer. The basic components of the thermal printer 10 include a support (shaft) 11 which provides a takeoff mechanism for the roll 12 of linerless labels. The labels have a first face 13 which is printable, typically thermally printable, and also has a release material coating such as silicone so that the labels in the roll 12, will not stick each other; and a second face 14 with a pressure sensitive adhesive which may be either repositional, removable, or permanent adhesive. The label material goes past the idler roller 15 driven by a drive roller 16. The thermal print head 17 engages the printable surface 13 of the labels, while the adhesive of face 14 comes into contact with the periphery of the drive roller 16. The periphery of the drive roller 16 is covered with an adhesive release material, such as silicone, or is plasma coated so as to provide a non-stick surface. Downstream of the drive roller 16 is a cutter 18 of any suitable type, such as a guillotine cutter, scissors cutter, rotating cutter cylinder, or even a structure performing the same function such as a detacher or burster if the labels forming the roll 12 are perforated.

The printer 10 is controlled by a conventional computer 20, such as a P.C. The operator selects and inputs information about the labels to be run, such as the quantity, what indicia is to be printed on them, and sometimes parameters such as label length or the like if not predetermined. Under the influence of the computer 20 the drive roller 16 is rotated clockwise to move the leading edge 22 of the leading label in the roll 12 to a first position in which it is aligned with the cutter 18. An appropriate formatting signal is received by the printer 10 firmware from the computer 20. Then—as seen in FIG. 1B—the roller 16 is rotated counterclockwise to back feed the label so that leading edge 22 thereof is under the thermal print head 17 as illustrated in FIG. 1B. When in this position the printer 10 receives second formatting instructions from the computer 20, for example, the graphics, text, bar codes or the like to be printed. The leading edge 22 may be parked under the print head 17 for as much as two or three seconds while the second formatting takes place. Since the print head 17 is providing a downward compressive force on the label of about 9.5 pounds, the pressure sensitive adhesive 14 may stick to the peripheral surface of the drive roller 16 despite its non-stick characteristics. If that does occur, then after the second formatting when the roller 16 is again driven clockwise to initiate and effect printing and feeding of the printable surface 13, the adhesive 14 has grabbed the peripheral surface of the drive roll 16 and does not have time to release, and therefore becomes wrapped around the drive roll 16 as illustrated in FIG. 1C, or the label otherwise jams the printer path.

FIGS. 2A and 2B illustrate the sequence of operation of the printer path according to the method of the present invention, the components of the printer 10 being identical to the conventional components illustrated in FIGS. 1A through 1C. The operation in FIG. 2A is the same as FIG. 1A, that is the drive roller 16 is operated under control of the computer 20 and the firmware in the printer 10 so that the leading edge 22 of the first label from the roll 12 is aligned with the cutter 18, in the first position. When in that position, the printer 10 is completely formatted, with all formatting information including what graphics, text, bar code or the like to be printed, how many labels, label length if necessary, etc. Since the leading edge 22 is not under the print head 17 at this time and since the peripheral surface of the roller 16 is non-stick, the adhesive 14 will not be able to sufficiently grab the roller so as to wrap around the roller 16 when it does rotate.

FIG. 2B illustrates the next steps, in which the drive roller 16 is controlled to reverse the label leading edge 22 so that it is back under the print head 17, and then substantially immediately (i.e. within at most about 0.5 seconds, and preferably within about 0.1 seconds) initiating printing with the print head 17 advancing with the roller 16 and cutting off the leading label from the roll 12 using cutter 10, and resuming the printing, advancing and cutting functions until the leading label, or series of labels, is/are printed and cut. Then the operation is restarted.

FIG. 3 schematically illustrates in flow chart form the sequence of steps associated with the operation of the printer 10 as illustrated in FIGS. 2A and 2B. The first step in FIG. 3, indicated generally by reference numeral 25, is the installation of a new label roll 12 on the shaft 11. Then quantities of labels to run, or other parameters are selected/input by the operator in computer 20. This may include formatting information or the formatting information may already be standard in the firmware of the printer 10. Then, as indicated by box 27, the drive roll 16 is operated to feed the first label to the start position where the leading edge 22 is in alignment with the cutter 18 as illustrated in FIG. 2A. Then the firmware of the printer 10 loads all of the formatting information—as indicated by box 28—including the graphics, text, bar codes, or the like to be printed, and whether additional information is necessary. Then—as illustrated schematically in FIG. 2B—drive roll 16 is reversed to reverse the label (the first label) to the print position (see in FIG. 1B) as illustrated by box 29, and then immediately thereafter—as indicated by box 30—the printing and feeding operations are started. At the end of a print run—as indicated by box 31—one returns to the flow charts just before the selection box 26. Normally, after the initial start up of a new roll, the leading edge 22 of the next label to be printed will already be in alignment with the cutter 18 so that nothing need happen in step 27 as far as control of the printer is concerned, except perhaps a sensing step to determine that the leading edge 22 is properly positioned (as illustrated in FIG. 2A).

While the operation of the printer 10 as illustrated in FIGS. 2A, 2B and 3 is very successful in preventing the wrap around condition, or printer jamming, as illustrated in FIG. 1C, when very aggressive adhesives 14 are utilized (such as some permanent adhesives) there still can be a tendency for the leading label to stick to the non-stick peripheral surface of the drive roll 16, causing printer jamming or the like. In order to essentially eliminate any possibility for such sticking, another method step may be employed utilizing the air knife 35 illustrated in FIGS. 4 and 5. As its name applies, the air knife 35 directs a substantially uniform flow of pressurized gas (preferably air although other gases, such as inert gases, may be utilized) between the second adhesive face 14 of the labels of the roll 12 and the drive roller 16 (i.e. the flow of gas is directed to the interface area between the label and the peripheral surface of the drive roller 16) which prevents sticking of the adhesive to the roller 16 once it does start moving. Utilizing the air knife 35 there is essentially no chance of the adhesive sticking to the non-stick surface of the drive roll 16.

Figure 5:
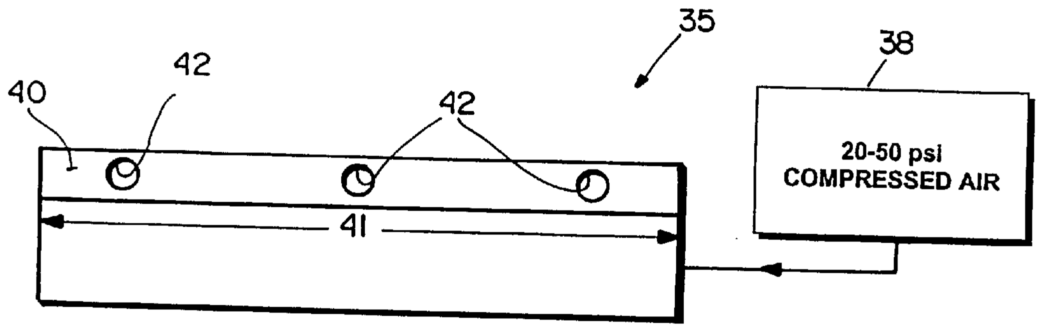
FIG. 5 is a view looking in on the top of the air knife of FIG. 4 and schematically illustrating connection thereof to a source of compressed air.

As seen in FIGS. 4 and 5, the air knife 35 comprises a body 36 having an interior header passageway 37 thereof which communicates with a source 38 (see FIG. 5) of pressurized gas, such as compressed air at a pressure of about 20–50 psi (preferably about 30 psi). A plurality of passageways 39 extend in the body 36 from the header passageway 37 to an end surface 40 of the air knife 35. The passageways 39 are substantially evenly spaced along the length 41 of the end 40 of the air knife 35 (which length 41 may, for example, be about 1–2 inches) and in the preferred embodiment illustrated in FIG. 5 three passageways are provided terminating in openings 42 formed in the end surface 40. Preferably the openings 42 are very small, for example, having a maximum dimension of about 0.01 to about 0.05 inches; in the preferred embodiment the openings 42 are substantially circular, having a diameter of about 0.03 inches. Depending upon the number of openings 42 provided (e.g. 2–8), the pressure of the gas being supplied may vary, but the pressure is always maintained approximately at about 30 psi.

While the openings 42 may be straight, plain, openings, they also may comprise nozzles, flow restrictors, flow directors, or a large number of other fluidic structures as long as they achieve the ultimate purpose of substantially uniform flow of pressurized gas directed toward the interface area between the label and the printer drive roller 16 peripheral surface.

FIG. 4 illustrates a desired position of the air knife 35 with respect to the roller 16 and the cutter 18. In the embodiment illustrated in FIG. 4 the cutter 18 comprises a rotating cylinder 45 with a cutting blade 46 thereon, cooperating with an anvil 47.

The air knife 35 may be utilized/operated in a number of different ways. For example, the air knife 35 may be operating constantly, with the source 38 constantly supplying approximately 20–50 psi compressed air. Alternatively, the air flow from the openings 42 to the interface area between a leading label and the drive roll 16 periphery at the printer head 17 may be provided only when rotation of the drive roll 16 clockwise is initiated to advance (during printing) a label. This last operation sequence is illustrated schematically in FIG. 3 where the box 50 indicates that air flow is started to the air knife 45 (e.g. by controlling a valve associated with the compressed air source 38) at some time during the reversing of the drive roll 16 (box 29 in FIG. 3), and the air flow ends once the end of run box 31 is reached, as indicated by 51 in FIG. 3.

Utilizing the air knife 35 sticking of the adhesive 14 to the peripheral surface 16 is essentially completely eliminated especially when combined with the printer operation illustrated in FIGS. 2A, 2B and 3.

It will thus be seen that according to the present invention an advantageous method of operating a printer for printing linerless labels, and a thermal printer for printing such labels, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. A method of operating a printer having a non-stick peripheral surface drive roller, cutter, and print head to print linerless labels in a roll having a printable first face and a second face with pressure sensitive adhesive without the pressure sensitive adhesive sticking to the drive roller, comprising the steps of sequentially:

(a) operating the drive roller to advance the roll of linerless labels so that the second face is in contact with the drive roller and so that the leading edge of the linerless labels in the roll is aligned with the cutter, in a first position;

(b) completely formatting the printer while the leading edge is in the first position, so that the printer has all necessary print commands to print a leading label in the roll, or series of labels in the roll;

(c) reversing the label leading edge by operating the drive roller so that the leading edge moves to an initial position for printing of the leading label in the roll by the print head; and (d) substantially immediately after step (c) initiating printing and advancing of the leading label, and cutting of the leading label from the roll, and continuing printing and advancing and cutting until the leading label or series of labels is or are printed and cut.

2. A method as recited in claim 1 comprising the further step of (e) at least during the practice of step (d) supplying a substantially uniform flow of pressurized gas between the second face of the label at the drive roller and the drive roller to prevent the pressure sensitive adhesive of the second face from sticking to the drive roller.

3. A method as recited in claim 2 wherein step (e) is practiced by supplying a substantially uniform flow of air at a pressure of about 30 psi.

4. A method as recited in claim 2 wherein step (e) is practiced substantially continuously through all of steps (a)–(d).

5. A method as recited in claim 2 wherein step (e) is practiced substantially only when step (d) is being practiced.

6. A method as recited in claim 2 wherein step (e) is practiced by supplying a substantially uniform flow of gas at a pressure of about 20–50 psi.

7. A method as recited in claim 6 wherein the roll of linerless labels comprises a thermally printable first face, and wherein the print head comprises a thermal print head, and wherein step (d) is practiced by applying heat to the first face of each label to effect printing while applying a compressive force by the print head to the first face of each label.

8. A method as recited in claim 7 wherein step (e) is practiced by supplying a substantially uniform flow of air at a pressure of about 30 psi.

9. A method as recited in claim 8 wherein step (d) is practiced with a delay of less than 0.5 seconds once reversing action pursuant to step (c) has been stopped.

10. A method as recited in claim 1 wherein step (d) is practiced with a delay of less than 0.5 seconds once reversing action pursuant to step (c) has been stopped.

11. A method as recited in claim 1 wherein the roll of linerless labels comprises a thermally printable first face, and wherein the print head comprises a thermal print head, and wherein step (d) is practiced by applying heat to the first face of each label to effect printing while applying a compressive force by the print head to the first face of each label.

12. A method as recited in claim 11 wherein step (d) is practiced with a delay of less than 0.5 seconds once reversing action pursuant to step (c) has been stopped.

* * * * *